(12) United States Patent
Nardicchia

(10) Patent No.: US 12,442,417 B2
(45) Date of Patent: Oct. 14, 2025

(54) SEALING CAP OR COMPONENT OF A SEALING DEVICE FOR A ROLLER BEARING, ASSOCIATED ROLLER BEARING, IN PARTICULAR FOR A HUB BEARING UNIT, AND ASSOCIATED METHOD

(71) Applicant: AKTIEBOLAGET SKF, Götenborg (SE)

(72) Inventor: Riccardo Nardicchia, Turin (IT)

(73) Assignee: AKTIEBOLAGET SKF, Götenborg (SE)

( * ) Notice: Subject to any disclaimer, the term of this patent is extended or adjusted under 35 U.S.C. 154(b) by 0 days.

(21) Appl. No.: 18/223,728

(22) Filed: Jul. 19, 2023

(65) Prior Publication Data

US 2024/0044373 A1 Feb. 8, 2024

(30) Foreign Application Priority Data

Aug. 5, 2022 (IT) .......................... 102022000016641

(51) Int. Cl.
*F16C 33/78* (2006.01)
*F16C 33/72* (2006.01)

(52) U.S. Cl.
CPC .......... *F16C 33/782* (2013.01); *F16C 33/723* (2013.01); *F16C 33/7889* (2013.01)

(58) Field of Classification Search
CPC ...... F16C 33/723; F16C 33/78; F16C 33/782; F16C 33/7823; F16C 33/7889; F16C 33/80
See application file for complete search history.

(56) References Cited

U.S. PATENT DOCUMENTS

| 5,577,741 | A  | * | 11/1996 | Sink ..................... F16J 15/3252 |
|---|---|---|---|---|
|  |  |  |  | 277/565 |
| 6,939,050 | B2 | * | 9/2005 | Ohtsuki ................ F16J 15/326 |
|  |  |  |  | 384/482 |
| 6,979,001 | B2 |  | 12/2005 | Ohtsuki et al. |
| 7,812,599 | B2 | * | 10/2010 | Ishii ...................... F16J 15/326 |
|  |  |  |  | 324/207.25 |
| 8,721,186 | B2 | * | 5/2014 | Le Reun ................ G01P 3/487 |
|  |  |  |  | 384/489 |

(Continued)

FOREIGN PATENT DOCUMENTS

JP 2012167821 9/2012

OTHER PUBLICATIONS

International Search Report for corresponding Italy Patent Application No. 102022000016641 dated Feb. 24, 2023.

*Primary Examiner* — Nicholas L Foster
(74) *Attorney, Agent, or Firm* — J-TEK LAW PLLC; Scott T. Wakeman; Mark A. Ussai

(57) ABSTRACT

A sealing system for a roller bearing including a first annular shield and a first sealing cover. A first face of each that includes a coupling surface that is covered with a rubbery coating made of a synthetic rubber. The coupling surface of the first annular shield is coupled to a corresponding coupling surface of a rotating ring of the roller bearing, and the coupling surface of the first sealing cover is coupled to a corresponding coupling surface of an outer ring of the roller bearing. Each of the first annular shield and the first sealing cover is pressed from a metal sheet with a first face entirely rubberized with the rubbery coating.

12 Claims, 5 Drawing Sheets

(56) References Cited

U.S. PATENT DOCUMENTS

| | | | |
|---|---|---|---|
| 8,828,178 B2 * | 9/2014 | Yamamoto | F16C 41/007 |
| | | | 277/572 |
| 11,873,904 B2 * | 1/2024 | Duch | F16J 15/324 |
| 2008/0031561 A1 * | 2/2008 | Hakata | F16C 41/007 |
| | | | 384/544 |
| 2008/0218161 A1 * | 9/2008 | Ishii | F16C 33/78 |
| | | | 384/446 |
| 2011/0133412 A1 * | 6/2011 | Mause | F16C 33/7863 |
| | | | 277/352 |
| 2012/0098208 A1 * | 4/2012 | Yamamoto | F16J 15/3264 |
| | | | 277/549 |
| 2012/0177312 A1 * | 7/2012 | Aritake | F16C 41/007 |
| | | | 384/446 |
| 2014/0193107 A1 * | 7/2014 | Baratti | B60B 27/0073 |
| | | | 384/446 |
| 2014/0193108 A1 * | 7/2014 | Baratti | B60B 27/0005 |
| | | | 384/448 |
| 2014/0193109 A1 * | 7/2014 | Baratti | F16C 33/723 |
| | | | 384/448 |
| 2015/0128415 A1 * | 5/2015 | Russalian | F16C 33/7886 |
| | | | 277/352 |
| 2016/0061264 A1 * | 3/2016 | Berens | F16C 33/6603 |
| | | | 384/481 |
| 2022/0112958 A1 * | 4/2022 | Duch | F16J 15/324 |
| 2023/0160433 A1 * | 5/2023 | Bertolini | F16C 23/045 |
| | | | 384/486 |
| 2023/0265887 A1 * | 8/2023 | Bertolini | F16C 19/06 |
| | | | 384/486 |
| 2024/0003384 A1 * | 1/2024 | Frezza | F16J 15/3204 |

* cited by examiner

SEALING CAP OR COMPONENT OF A SEALING DEVICE FOR A ROLLER BEARING, ASSOCIATED ROLLER BEARING, IN PARTICULAR FOR A HUB BEARING UNIT, AND ASSOCIATED METHOD

CROSS REFERENCE TO RELATED APPLICATIONS

This application is based on and claims priority to Italian Patent Application No. 102022000016641 filed on Aug. 5, 2022, under 35 U.S.C. § 119, the disclosure of which is incorporated herein by reference in its entirety.

TECHNOLOGICAL FIELD

The present disclosure relates to a sealing system for roller bearings.

BACKGROUND

Known roller bearings may include a radially inner ring, a radially outer ring, and a plurality of rolling elements (e.g., balls, cylindrical rollers, or tapered rollers) interposed between the inner ring and outer ring so as to make the inner ring and outer ring rotatable relative to each other. The rolling elements may engage with raceways formed on a radially outer side surface of the inner ring and a corresponding radially inner side surface of the outer ring. The rolling elements may be housed in an annular compartment defined between the inner ring and the outer ring an annular compartment. Lubricating grease may also be housed in the annular compartment to lubricate the rolling elements and reduce friction between the raceways of the inner and outer rings and the rolling elements. A sealing system may be used to close off the annular compartment at two opposite axial ends thereof and, keeping lubricant in the annular compartment while keeping external contaminants, such as water, dust, and debris, out of the annular compartment.

When the roller bearing forms part of a wheel hub unit, or constitutes the entire wheel hub unit, the inner ring and the outer ring are each provided with a flange for mounting the wheel hub unit onto a vehicle suspension upright or a railway axle, which exposes the open ends of the annular compartment.

Current solutions to protecting the roller bearing and the annular compartment include attaching a sealing cover to the outer ring of the bearing unit to close off one of the open ends of the annular compartment, such as the outboard end of the roller bearing. This however, may leave the inboard end of the roller bearing exposed. Other solutions include attaching one or more sealing devices to a rotating ring of the roller bearing on at least an outboard side of the roller bearing to close off the corresponding open end of the annular compartment. Each sealing device may include a first shield coupled to the inner ring and a second shield coupled to the outer ring, and each shield may be provided with an elastomer portion that has sealing lips forming labyrinth seals between the two shields. The shield integrally joined to the ring which is rotating during use is also called a "flinger" or "centrifuge" because expels contaminants as a result of the centrifugal force of rotating of the rotating ring during use of the roller bearing.

These known sealing systems, however, have drawbacks. In particular, the metal-to-metal contact between surfaces of the rings of the bearing unit and surfaces of the components of the sealing systems can cause: (1) corrosion due to water infiltration at the static sealing interface between surfaces of the rings of the roller bearing and the coupling surfaces of the components of the sealing system; (2) undesirable relative movement of the rings and the components of the sealing system caused by use of the wheel hub, with negative effects not only on the static hydraulic seal between the surfaces of the rings and the coupling surfaces of the components of the sealing system, but also on the overall friction of the sealing system with shields provided with sliding sealing lips (as a result of the variable and irregular compression of the elastomeric lips mounted on the flinger, which can give rise to an unpredictable friction coefficient of the sealing device and a high sensitivity to mounting tolerances); and (3) deformation of the components of the sealing system caused during mounting onto the roller bearing, which reduces the static sealing action at the coupling interface.

In order to overcome these problems, it has been proposed to use sealing compounds at the coupling interface applied during assembly. This, however, results in operational complexity and additional costs. Another proposed solution is to apply rubber compounds by overmoulding the portions of the shields/cap making contact with the bearing rings. This, however, results in an undesirable increase in dimensions of the sealing system and high operating costs due both to the molding tool (these rubber parts may be co-molded together with the shields/cap, in the same way as the sealing lips, inside special molds provided with movable parts to prevent undercuts) and to the necessary additional superficial treatment of the surfaces intended to receive these additional rubber parts. Moreover, owing to their thickness, these additional rubber parts tend, during force-fitting together of the bearing rings and shields and/or cap, to become deformed and distorted, resulting in possible incorrect positioning of the shields when mounted to the rings of the bearing unit (which increase friction between the parts during use) and difficulties in the joining process.

SUMMARY

It is therefore an object of the present disclosure to provide a sealing system for a roller bearing that overcomes these drawbacks, has small overall dimensions, is low-cost to produce, and is easy to mount on the bearing unit.

It is also an object of the disclosure to provide an associated roller bearing that provides a secure static seal against external contaminants and, therefore, optimum protection of the rolling elements of the bearing unit, which at the same time can be easily assembled and is low-cost to produce.

BRIEF DESCRIPTION OF THE DRAWINGS

Characteristic features and advantages of the present disclosure will become clear from the following description of non-limiting embodiments thereof, provided with reference to the figures in the attached drawings, in which.

DETAILED DESCRIPTION

Figure 1:
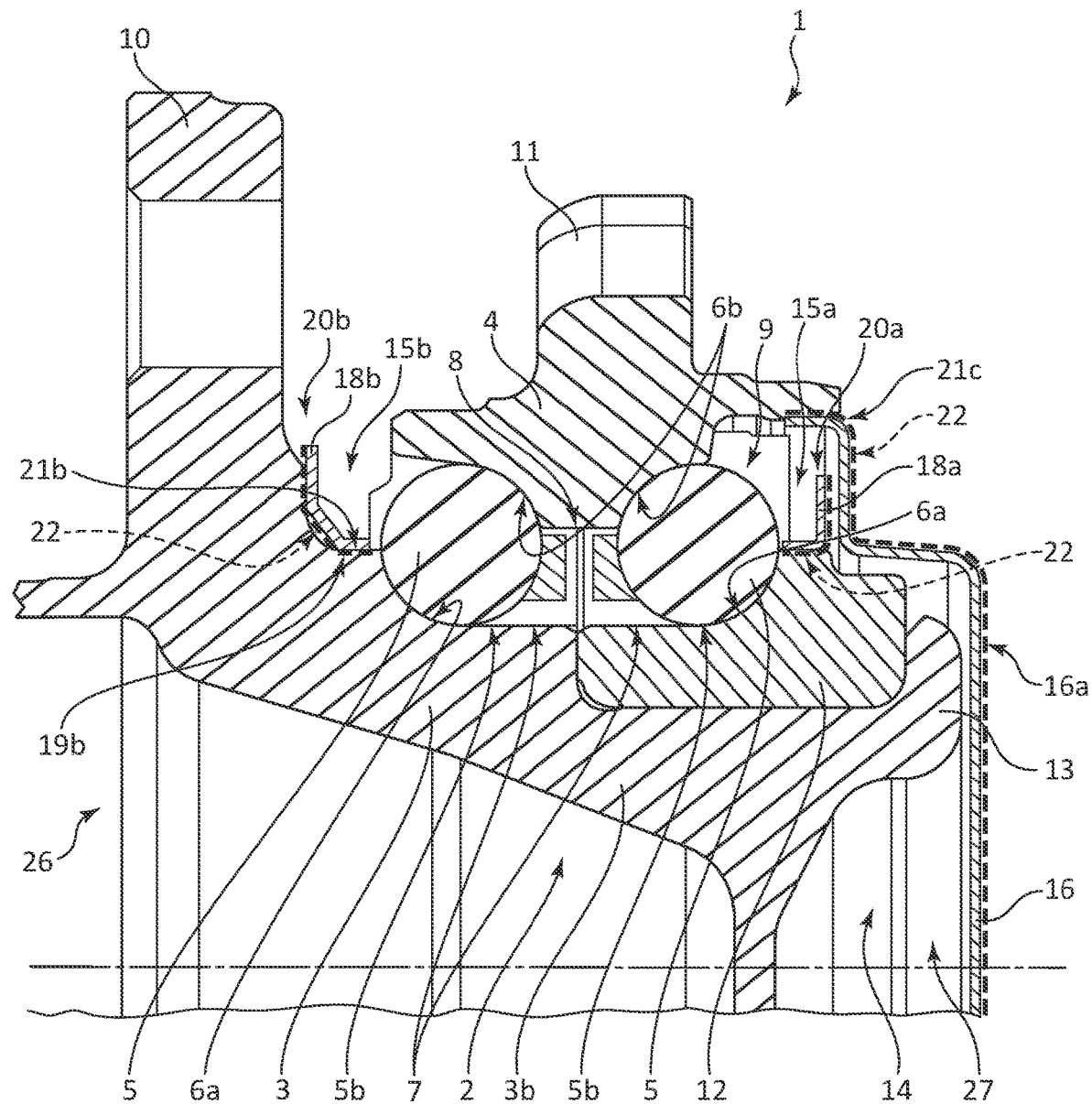
FIG. 1 is a radial cross-section of a wheel hub unit or assembly including a hydraulic sealing system according to exemplary embodiments of the present disclosure.

With reference to FIGS. 1 to 5, a wheel hub unit or assembly 1 may include a roller bearing 2, which in turn may include a radially inner ring 3, a radially outer ring 4, and a plurality of rolling elements 5, e.g., balls, cylindrical rollers, tapered rollers, etc. In some embodiments, rolling elements 5 may be grouped together in two rows of rolling elements 5b and interposed between inner ring 3 and outer ring 4 so that inner ring 3 and outer ring 4 are rotatable relative to each other with a small degree of friction (i.e. with revolving rather than sliding friction).

In some embodiments, rolling elements 5 may engage inside raceways 6a formed on a radially outer surface 7 of inner ring 3 and raceways 6b formed on a radially inner surface 8 of outer ring 4. In some embodiments, an annular compartment 9 may be defined between outer surface 7 of inner ring 3 and side surface 8 of outer ring 4 in which rolling elements 6 and lubricating grease (not shown for simpler illustration) reside.

In some embodiments, inner ring 3 may be provided with a flange 10 that may receive a vehicle wheel of a vehicle (not shown for simplicity of illustration), and outer ring 4 may be provided with a flange 11 that may be fixed to a vehicle suspension upright (not shown for simplicity of illustration). In this way, in some embodiments, wheel hub unit 1 may be formed in its entirety by roller bearing 2.

In some embodiments, inner ring 3 may be divided into an annular element 3b provided with flange 10 and a mounting ring 12. Mounting ring 12 may be axially locked onto annular element 3b on a side of inner ring 3 axially opposite flange 10 by an axial end 13 of annular element 3b. In some embodiments, axial end 13 may be swaged and folded radially outward to form an L-shaped fold. It will be appreciated by a person of ordinary skill in the art that mounting ring 12 may be fixed to inner ring 3 by other known means.

In some embodiments, rolling bearing 2 may be provided with a hydraulic sealing system 14. Hydraulic sealing system 14 protects rolling elements 5 and raceways 6a, 6b from corrosion and damage caused by infiltration of external contaminants, such as water, mud, dust, and sand, into annular compartment 9. Hydraulic sealing system 14 may include at least one sealing device 15 and/or a sealing cover 16. As illustrated in FIG. 1, hydraulic sealing system 14 may include two sealing devices 15a, 15b and a sealing cover 16. In some embodiments, each sealing device 15a, 15b may be a "cassette" sealing device, or any other known sealing devices. In some embodiments, sealing cover 16 may be cup shaped. In some embodiments, each sealing device 15a, 15b may include at least one annular shield 18a, 18b, respectively, with an L-shaped radial cross section.

In some embodiments, shields 18a, 18b may be mounted annularly on and integral with inner ring 3. In particular, shields 18a, 18b may be interference fit onto a portion of outer surface 7 of inner ring 3. In embodiments in which inner ring 3 rotates about an axis of rotation of roller bearing, shield 18 may rotate with inner ring 3 and act as a centrifuging element that expels external contaminants from annular compartment 9.

In some embodiments, although not illustrated, each sealing device 15a, 15b may include a second annular shield, which may be provided with one or more elastomeric sealing lips (known and not shown for simplicity of illustration) mounted facing a respective shield 18a, 18b of sealing device 15a, 15b in order to improve the sealing effect of sealing system 14. Of course, physical constraints of a particular wheel hub unit 1 and or roller bearing 2 may necessitate a sealing system 14 with only one shield per sealing device, e.g., annular shields 18a, 18b, which will be appreciated by a person of ordinary skill in the art.

In some embodiments, sealing cover 16 may be coupled to radially outer ring 4 by means of a force-fitting joint.

In some embodiments, sealing system 14 may be bounded over a whole of a first side 20a by a first face 19a of shield 18a and may be bounded over a whole of a second side 20b by a second face 19b of shield 18b. In some embodiments, first side 20a may be located on an axial side of wheel hub unit 1 opposite flange 10 (e.g., adjacent to annular compartment 9) and second side 20b may be located on an axial side of wheel hub unit 1 adjacent to flange 10 such that rolling elements 5 reside axially between first side 20a and second side 20b. In some embodiments, sealing system 14 may further be bounded over first side 20a by sealing cover 16.

In some embodiments, a first coupling surface 21a may be formed on first face 19a of annular shield 18a for coupling annular shield 18a to mounting ring 12 at first side 20a of sealing system 14. In some embodiments, a second coupling surface 21b may be formed on second face 19b of annular shield 18b for coupling annular shield 18b to inner ring 3 at second side 20b of sealing system 14. In some embodiments, a third coupling surface 21c may be formed on a third face 16a on an outer surface of sealing cover 16 for coupling sealing cover 16 to outer ring 4 (see, e.g., FIG. 1). Alternatively, third coupling surface 21c may be formed on a fourth face 16b on an inner surface 16b of sealing cover 16 for coupling sealing cover 16 to outer ring 4 (see, e.g., FIG. 3).

In some embodiments, one or more of first face 19a, second face 19b, third face 16a, and fourth face 16b may be covered with a paint-like, rubbery coating 22, illustrated in FIGS. 1-4 by means of a dotted line. In some embodiments, rubbery coating 22 may be made of a synthetic rubber, such as, but not limited to, nitrile butadiene rubber (NBR).

In some embodiments, rubbery coating 22 may have a predefined thickness, measured perpendicularly with respect to each respective face 19a, 19b, 16a, and 16b that is at least two orders of magnitude smaller than a thickness of sealing covers 16 or annular shields 18a, 18b at their respective face 19a, 19b, 16a, and 16b. In some embodiments, a thickness of rubbery coating 22 may be between 10 microns and 30 microns, inclusive. More specifically, in some embodiments, a thickness of rubbery coating 22 may be between 15 microns and 25 microns. In some embodiments, coating 22 may be uniform over an entirety of each respective face 19a, 19b, 16a, and 16b.

In some embodiments, both annular shields 18a, 18b and sealing cover 16 may be obtained by means of pressing or coining from a metal sheet that may rubberized on a face opposite the contact point of the pressing or coining (e.g., on faces 19a, 19b, 16a, and 16b). Alternatively, annular shields 18a, 18b and sealing cover 16 may be pressed or coined from a metal sheet that may be entirely rubberized on both faces (e.g., on faces 19a, 19b, 16a, 16b, and each respective face opposite faces 19a, 19b, 16a, and 16b).

Figure 3:
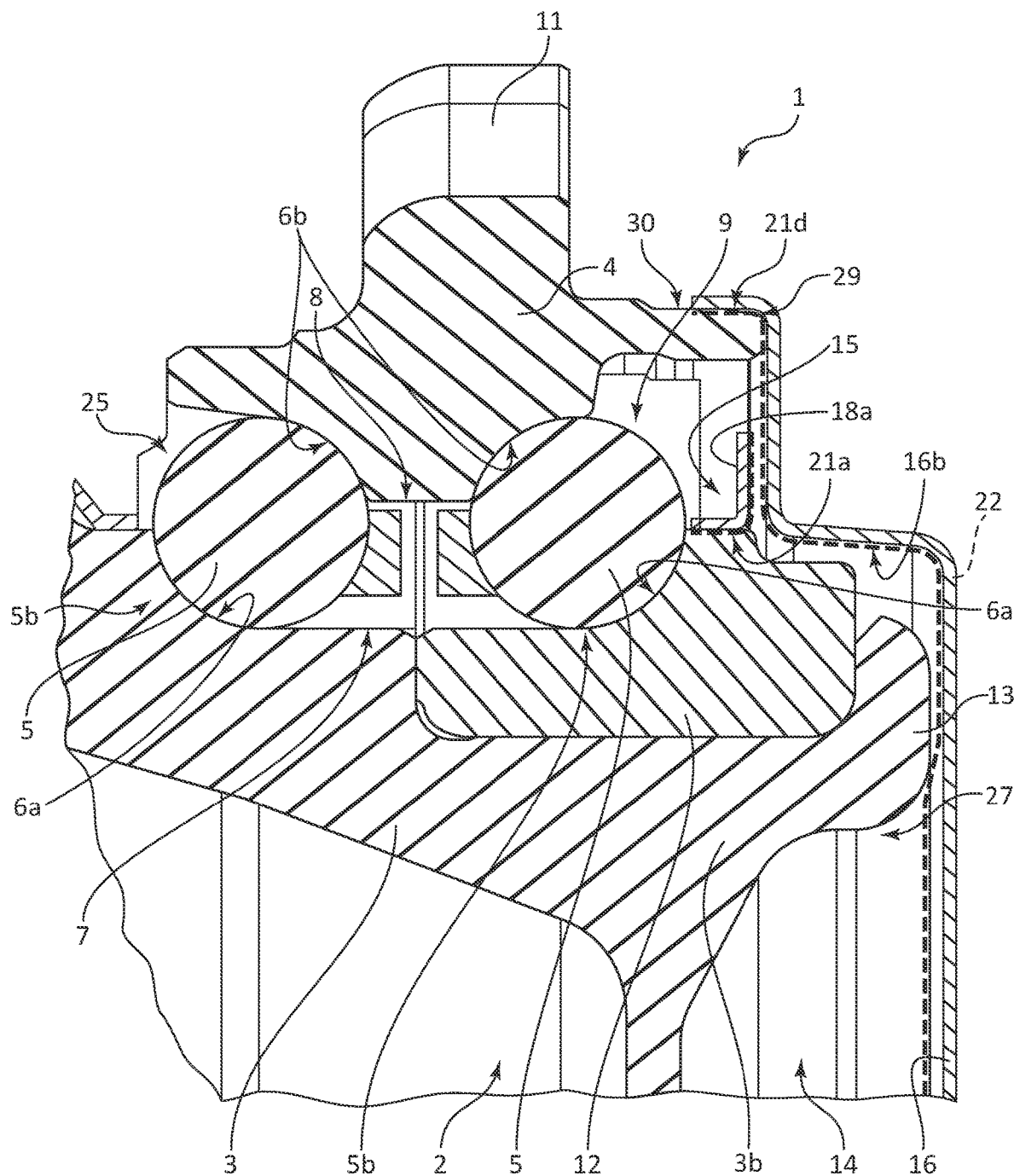
FIG. 3 is a radial cross-section of a wheel hub unit or assembly including a hydraulic sealing system according to exemplary embodiments of the present disclosure.
Figure 4:
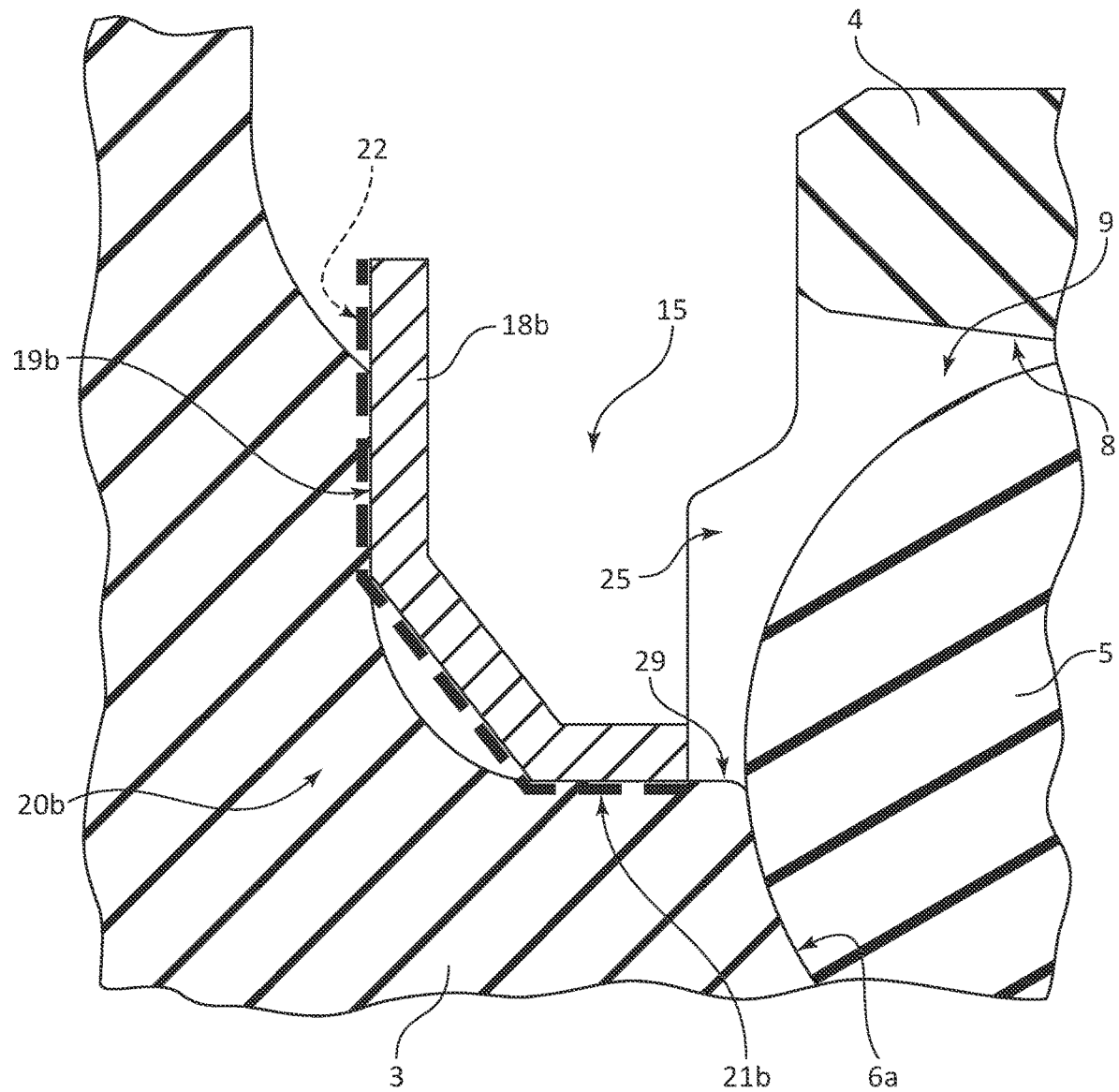
FIG. 4 is an enlarged view of a portion of the wheel hub of FIG. 1.

In some embodiments, annular shields 18a, 18b and sealing cover 16 may each include a metal support or substrate 23 made of a sheared and folded metal sheet (see, e.g., FIG. 3). In some embodiments, a non-stick coating 24 may be applied to some or all of an outer surface of rubber coating 22 (i.e., on a side of rubber coating 22 opposite faces 19a, 19b, 16a, and 16b). In some embodiments, a thickness of non-stick coating 24 may be negligible. Non-stick coating 24 reduces friction between coupling surfaces 21a, 21b, 21c, 21d and inner ring 3 and/or outer ring 4 to which sealing cover 16 and/or annular shields 18a, 18b are integrally attached. In some embodiments, non-stick coating 24 may be formed with a layer of wax or Polytetrafluoroethylene (PTFE). In some embodiments, non-stick coating 24 may be applied by means of spraying.

While FIG. 3 illustrates exemplary embodiments of metal support 23, non-stick coating 24, and rubbery coating 22 with reference to sealing cover 16, it will be appreciated by one of ordinary skill in the art that the same description can be applied to annular shields 18a and 18b.

In some embodiments, the metal sheet used to form metal support 23, and therefore metal support 23, may be made of a stainless steel material, such as but not limited to, AISI430. Metal support 23 may have a thickness of between 0.4 mm and 0.6 mm, inclusive. By forming sealing cover 16 and annular shields 18a, 18b from metal support 23 with a thickness in this range, and by providing coating 22 at a thickness of two magnitudes less than the thickness of the of metal support 23, which may be between 10 microns and 30 microns, an overall volume of sealing cover 16 and annular shields 18a, 18b is reduced. This is advantageous because a sealing cover 16 and annular shield 18a, 18b with these dimensions and this relationship are not subject to distortion and allow for ease and precision in mounting cover 16 and shields 18a, 18b onto wheel hub assembly 1. At the same time, the presence and particular thickness of coating 22 ensures a high degree of stability between cover 16, shields 18a, 18b, and the respective ring onto which each is mounted (e.g., inner ring 3 or outer ring 4). This helps prevent displacement of sealing cover 16 and annular shields 18a, 18b caused by mechanical stresses on roller bearing 2 during use. Furthermore, sealing cover 16 and annular shields 18a, 18b ensure a static hydraulic seal with inner ring 3 and outer ring 4, and such seal is achieved even where small deformations in a component are formed during assembly.

In some embodiments, the rubberized metal sheet can be found on the market for uses different from that defined here. For example, in the field of sealing systems, such a type of rubberized metal sheet may be used solely to form flat seals, for example seals for an engine head in internal-combustion engines.

A person of ordinary skill in the art will appreciate that, in some embodiments, roller bearing 2 may form a wheel hub unit 1 of a vehicle. In other embodiments, roller bearing 2 may form a wheel hub unit 1 for a railway axle, in which case roller bearing 2 may include a double row of tapered rollers. In such embodiments roller bearing 2 may include a radially outer ring 4, a radially inner ring 3 and a plurality of rolling elements 5 interposed between inner ring 3 and outer ring 4 and housed inside an annular compartment 9 bounded between inner ring 3 and outer ring 4. Annular compartment 9 may have opposite open ends 25a and 25b at opposite axial ends 26 and 27, respectively, of roller bearing 2 (see, e.g., FIGS. 1, 3).

While illustrated as covering only open end 25a of annular compartment 9, it will be appreciated by a person of ordinary skill in the art that, in some embodiments, both open ends 25a and 25b of annular compartment 9 may be closed by a sealing cover 16. In such embodiments, a second sealing cover 16 (not illustrated) may be coupled integrally with the radially outer ring 4 to cover and close off open end 25b. In still further embodiments, sealing device 15b may further include a second annular shield (not illustrated) coupled integrally with inner ring 3 or outer ring 4 that is rotating during use of roller bearing 2 that covers and closes off open end 25b. In some embodiments, sealing device 15a may also further include a second annular shield (not illustrated) coupled integrally with inner ring 3 or outer ring 4 that is rotating during use of roller bearing 2 that covers and closes off open end 25a.

Figure 2:
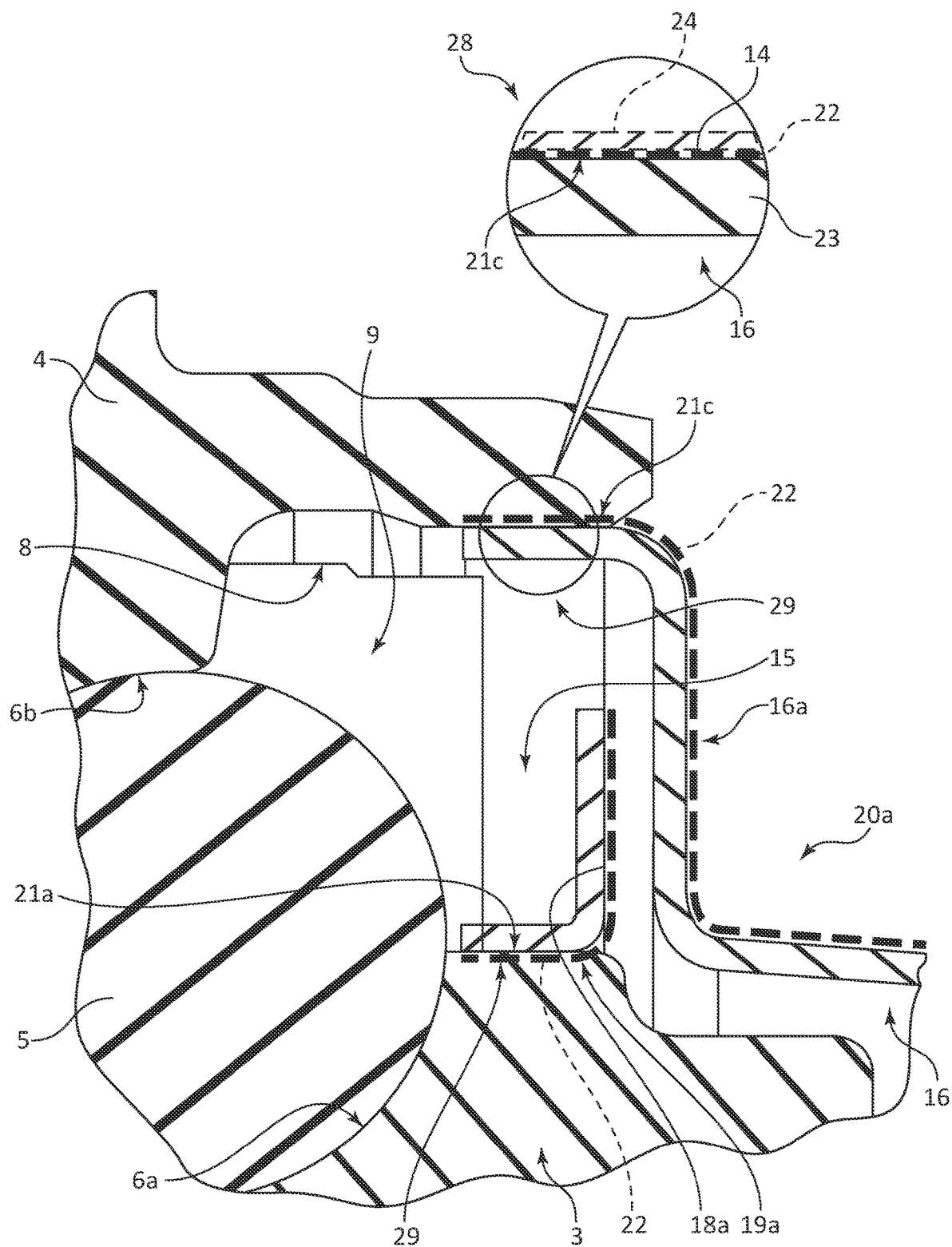
FIG. 2 is an enlarged portion of the wheel hub unit or assembly of FIG. 1.

In some embodiments, sealing cover 16 and annular shields 18a, 18b may be formed by a mechanical component 28 (see, e.g., FIG. 2). In some embodiments, mechanical component 28 may include metal support 23, rubbery coating 22 applied to a face of metal support 23, e.g., face 19a, 19b, 16a, 16b, provided with a respective coupling surface, e.g., surface 21a, 21b, 21c, 21d, for coupling with one of inner ring 3 and outer ring 4. In some embodiments, mechanical component 28 may further include a non-stick coating 24 applied over some or all of coating 22 or only over part of said paint-like rubber coating 22, and in particular applied over coupling surfaces 21a, 21b, 21c, 21d. In some embodiments, mechanical component 28 may be originally composite. In some embodiments, mechanical components 28 may be pressed or coined from a metal sheet, e.g., the metal sheet that forms metal support 23, rubberized on one of its faces on which coupling surfaces 21a, 21b, 21c, 21d may be formed.

Figure 5:
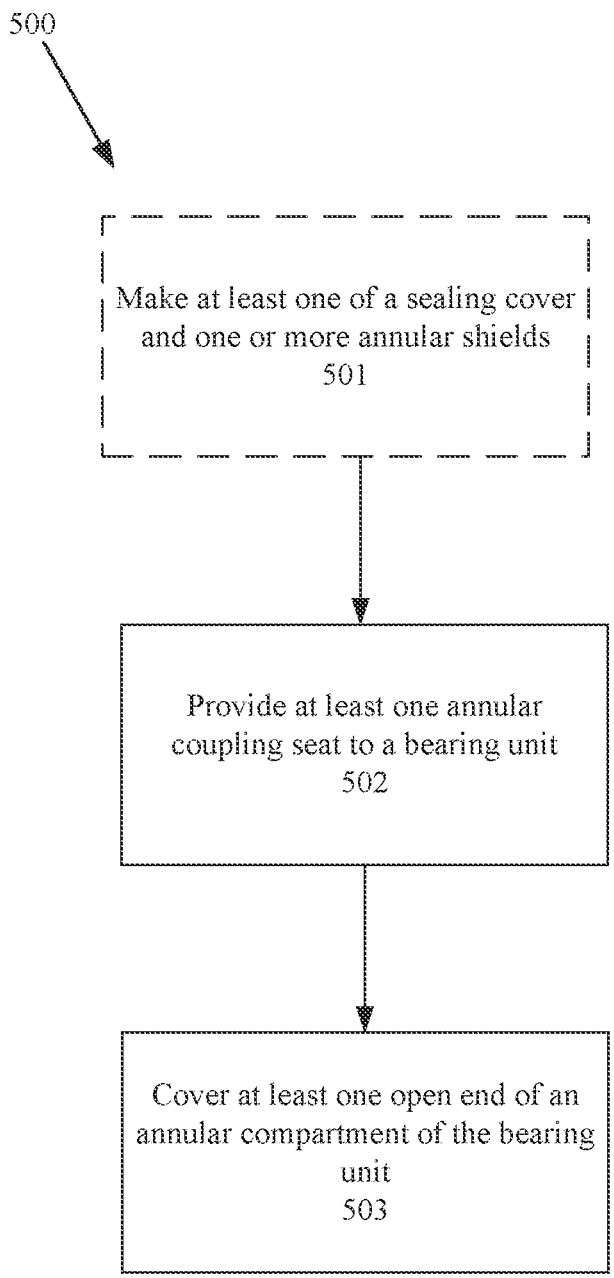
FIG. 5 is a flow chart illustrating a method for making a wheel hub unit or assembly according to exemplary embodiments of the present disclosure.

As illustrated in FIG. 5, in some embodiments, a method 500 for making a roller bearing may include providing 502 the roller bearing with at least one annular coupling seat and covering 503 at least one open end of an annular compartment of the roller bearing. Optionally, method 500 may further include forming 501 at least one sealing cover and at least one annular shield prior to covering 503 the at least one open end of the annular compartment of the roller bearing with the sealing cover.

In some embodiments, forming 501 at least one sealing cover and at least one annular shield may include forming a sealing cover 16 and an annular shield 18a and/or 18b. In some embodiments, forming 501 sealing cover 16 and annular shields 18a, 18b may include shearing and pressing each from a metal sheet, e.g., metal support 23. In some embodiments, the metal sheet may be rubberized on one side with a rubbery coating 22. In some embodiments, rubbery coating 22 may coincide with coupling surface 21a, 21b, 21c, and/or 21d for coupling sealing cover 16 and annular shields 18a, 18b to each respective coupling seat 29. In some embodiments, the metal sheet may be a coil or a plate. In some embodiments, a thickness of rubbery coating 22 may be between 10 microns and 30 microns, inclusive.

In some embodiments, pressing the sealing cover 16 and annular shields 18a, 18b may include first pressing a blank from the metal sheet covered with the rubbery coating 22, and then pressing the blank in the desired form, e.g., sealing cover 16 or annular shields 18a, 18b. In some embodiments, the blank may be pressed in a direction along which compressive loads may be formed, and in particular along coupling surface 21a, 21b, 21c, or 21d.

Method 500 may further include providing 502 a roller bearing with at least one coupling seat. In some embodiments, providing 502 a roller bearing with at least one coupling seat may include machining a coupling seat 29c into a radially inner surface of outer ring 4 (see, e.g., FIG. 1) and/or machining a coupling seat 29d into a radially outer surface of outer ring 4 (see, e.g., FIG. 3). In some embodiments, a coupling seat 29a may also be machined into a radially outer surface of mounting ring 12 of inner ring 3. In still further embodiments a coupling seat 29b may also be machined into a radially outer surface of inner ring 3 located at open end 25b. In some embodiments, a roughness of coupling seat 29a, 29b, 29c, and 29d may be between 0.8 microns and 1.2 microns, inclusive.

Method 500 may include covering 503 at least one open end of a roller bearing. In some embodiments, covering 502 at least one open end of a roller bearing may include coupling sealing cover 16 to outer ring 4 of roller bearing 2 to cover open end 25a of annular compartment 9. In some embodiments, a coupling surface 21c formed on an outer surface of sealing cover 16 may be integrally fitted to a coupling seat 29c of outer ring 4 formed on a radially inner surface of outer ring 4 (see, e.g., FIG. 1). In other embodiments, a coupling surface 21d formed on an inner surface of sealing cover 16 may be integrally fitted to a coupling seat 29d of outer ring 4 formed on a radially outer surface of outer ring 4 (see, e.g., FIG. 3).

In some embodiments, covering 503 at least one open end of a roller bearing may further include coupling at least one sealing device, e.g., 15a, 15b to a rotating ring of bearing unit 2, which may be either inner ring 3 or outer ring 4. In some embodiments, a coupling surface 21a, 21b of at least one annular shield, e.g., annular shield 18a, 18b, may be integrally fitted with a coupling seat 29a and 29b, respectively, of the rotating ring of bearing unit 2, which may be either inner ring 3 or outer ring 4.

In some embodiments of method 500, metal support 23 may be made of steel having a thickness of between 0.4 and 0.6 mm, inclusive, and coating 22 may be made of NBR. In some embodiments, coating 22 may cover an entirety of face 19a and 19b of annular shields 18a and 18b, respectively, and may cover an entirety of face 16a or 16b of sealing cover 16. In some embodiments, coating 22 may cover an entire face of mechanical component 28. In some embodiments, a non-stick coating 24 may be applied to some or all of the surface of coating 22 that couples shields 18a, 18b and sealing cover 16 to inner ring 3 and outer ring 4, respectively.

There are numerous other variants in addition to the embodiment of the disclosure described above. Furthermore, said embodiments are merely examples that limit neither the scope nor the disclosure nor the possible arrangements of the disclosure. Indeed, although the above description enables the person skilled in the art to carry out the present disclosure according to at least one example embodiment thereof, many variants of the described components can also be used without thereby departing from the scope of the disclosure as defined in the attached claims, which should be understood literally and/or according to the legal equivalents thereof.

It should be noted that the use of particular terminology when describing certain features or embodiments of the disclosure should not be taken to imply that the terminology is being re-defined herein to be restricted to include any specific characteristics of the features or embodiments of the disclosure with which that terminology is associated. Terms and phrases used in this disclosure, and variations thereof, especially in the appended claims, unless otherwise expressly stated, should be construed as open-ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least"; the term "such as" should be interpreted as "such as, without limitation"; the term "includes" should be interpreted as "includes but is not limited to"; the term "example" is used to provide exemplary instances of the item in discussion, not an exhaustive or limiting list thereof, and should be interpreted as "example, but without limitation"; adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range may be ±20%, ±15%, ±10%, ±5%, or ±1%. The term "substantially" is used to indicate that a result (e.g., measurement value) is close to a targeted value, where close may mean, for example, the result is within 80% of the value, within 90% of the value, within 95% of the value, or within 99% of the value. Also, as used herein "defined" or "determined" may include "predefined" or "predetermined" and/or otherwise determined values, conditions, thresholds, measurements, and the like.

I claim:

1. A sealing system for a wheel hub unit, comprising:
   a first annular shield comprising:
      a first face; and
      a coupling surface formed on the first face and configured to couple the first annular shield to a rotatable ring of the wheel hub unit;
   wherein the first face of the first annular shield including the coupling surface of the first annular shield is coated with a first layer of rubber having a thickness of between 10 microns and 30 microns inclusive, and
   wherein the first layer of rubber on the coupling surface of the first annular shield is coated with a layer of non-stick material.

2. The sealing system of claim 1, further comprising:
   a first sealing cover comprising:
      a first face; and
      a coupling surface formed on the first face of the first sealing cover and configured to couple the first sealing cover to a stationary ring of the wheel hub unit;
   wherein the first face of the first sealing cover including the coupling surface of the first sealing cover is coated with a second layer of rubber having a thickness of between 10 microns and 30 microns inclusive, and wherein the second layer of rubber on the coupling surface of the first sealing cover is coated with a layer of non-stick material.

3. The sealing system of claim 2, further comprises:
a second annular shield comprising:
   a first face; and
   a coupling surface formed on the first face of the second annular shield,
wherein the coupling surface of the second annular shield is covered with a third layer of rubber.

4. The sealing system of claim 2, wherein the second layer of rubber comprises nitrile-butadiene rubber.

5. The roller bearing according to claim 1, wherein the first layer of rubber comprises a first layer of synthetic rubber.

6. A sealing system for a wheel hub unit, comprising:
a first annular shield comprising:
   a first face; and
   a coupling surface formed on the first face and configured to couple the first annular shield to a rotatable ring of the wheel hub unit;
a first sealing cover comprising:
   a first face; and
   a coupling surface formed on the first face of the first sealing cover and configured to couple the first sealing cover to a stationary ring of the wheel hub unit; and
a second annular shield comprising:
   a first face; and
   a coupling surface formed on the first face of the second annular shield,
wherein the first face of the first annular shield is covered with a first layer of rubber having a layer of non-stick material thereon,
wherein the first face of the first sealing cover is covered with a second layer of rubber having a layer of non-stick material thereon, and
wherein the first face of the second annular shield is covered with a third layer of rubber,
wherein the first annular shield, the second annular shield, and the first sealing cover each include a metal support comprising a folded metal sheet.

7. The sealing system of claim 6, wherein the metal sheet comprises stainless steel and has a thickness of between 0.4 mm and 0.6 mm, inclusive.

8. A roller bearing, comprising:
a radially outer stationary ring;
a radially inner rotatable ring;
an annular compartment defined between the rotatable ring and the stationary ring, the annular compartment comprising;
a first axial end;
a second axial end;
a plurality of rolling elements interposed between the rotatable ring and the stationary ring and between the first axial end and the second axial end of the annular compartment; and
a sealing system according to claim 6 closing off the first axial end of the of the annular compartment,
wherein the coupling surface of the first annular shield is coupled to an outer surface of the radially inner rotatable ring.

9. The roller bearing according to claim 8, wherein the non-stick coating comprises a wax or polytetrafluoroethylene.

10. A roller bearing, comprising:
a radially outer stationary ring;
a radially inner rotatable ring;
an annular compartment defined between the rotatable ring and the stationary ring, the annular compartment comprising;
a first axial end;
a second axial end;
a plurality of rolling elements interposed between the rotatable ring and the stationary ring and between the first axial end and the second axial end of the annular compartment; and
a sealing system according to claim 2 closing off the first axial end of the of the annular compartment,
wherein the coupling surface of the first annular shield is coupled to an outer surface of the radially inner rotatable ring.

11. The roller bearing according to claim 10, wherein the non-stick coating comprises a wax or polytetrafluoroethylene.

12. The roller bearing according to claim 11, wherein the first layer of rubber comprises a first layer of synthetic rubber.

* * * * *